May 19, 1942.  C. GRANT ET AL  2,283,804
CARD PRINTING MACHINE
Filed April 27, 1940   5 Sheets-Sheet 1

Inventor
C. Grant
J. D. Cool
K. Lang
By Robert Cobb
Attorneys

May 19, 1942.                C. GRANT ET AL                2,283,804
                           CARD PRINTING MACHINE
                           Filed April 27, 1940            5 Sheets-Sheet 2
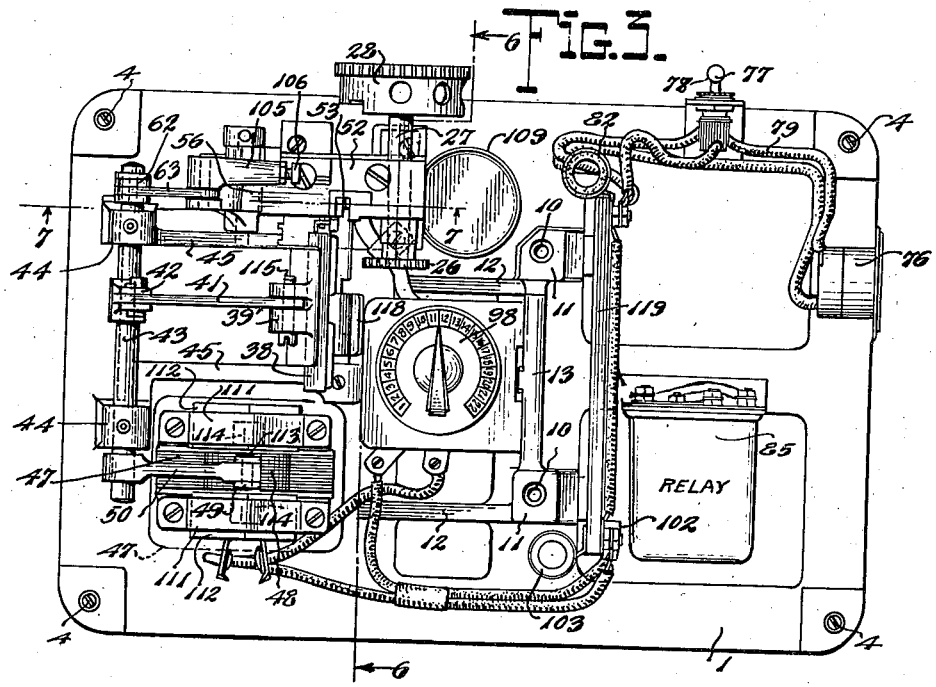
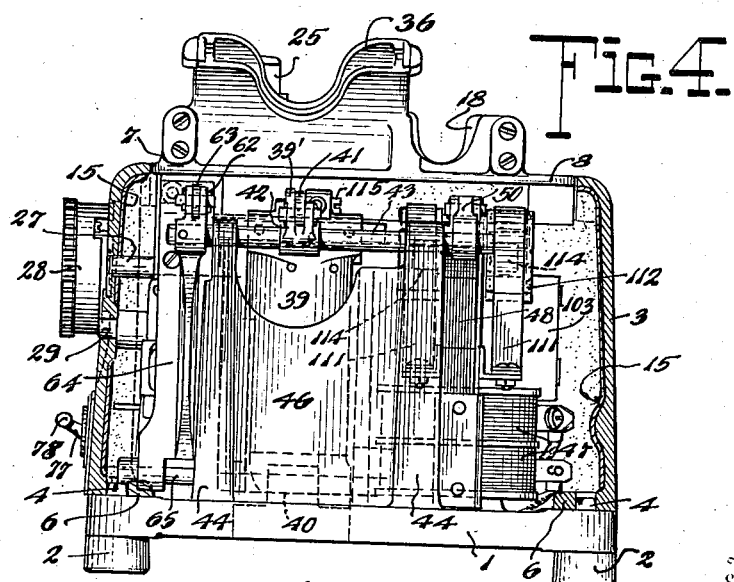

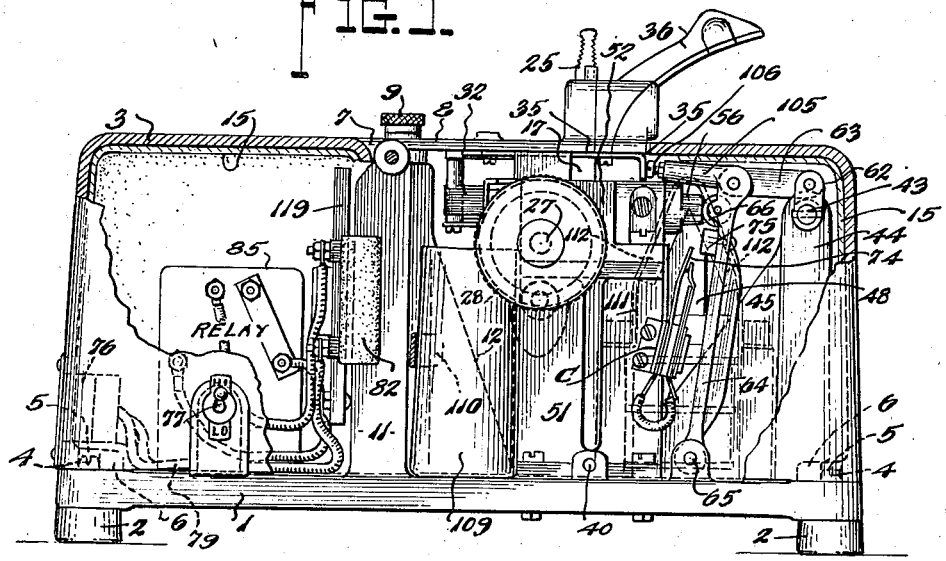

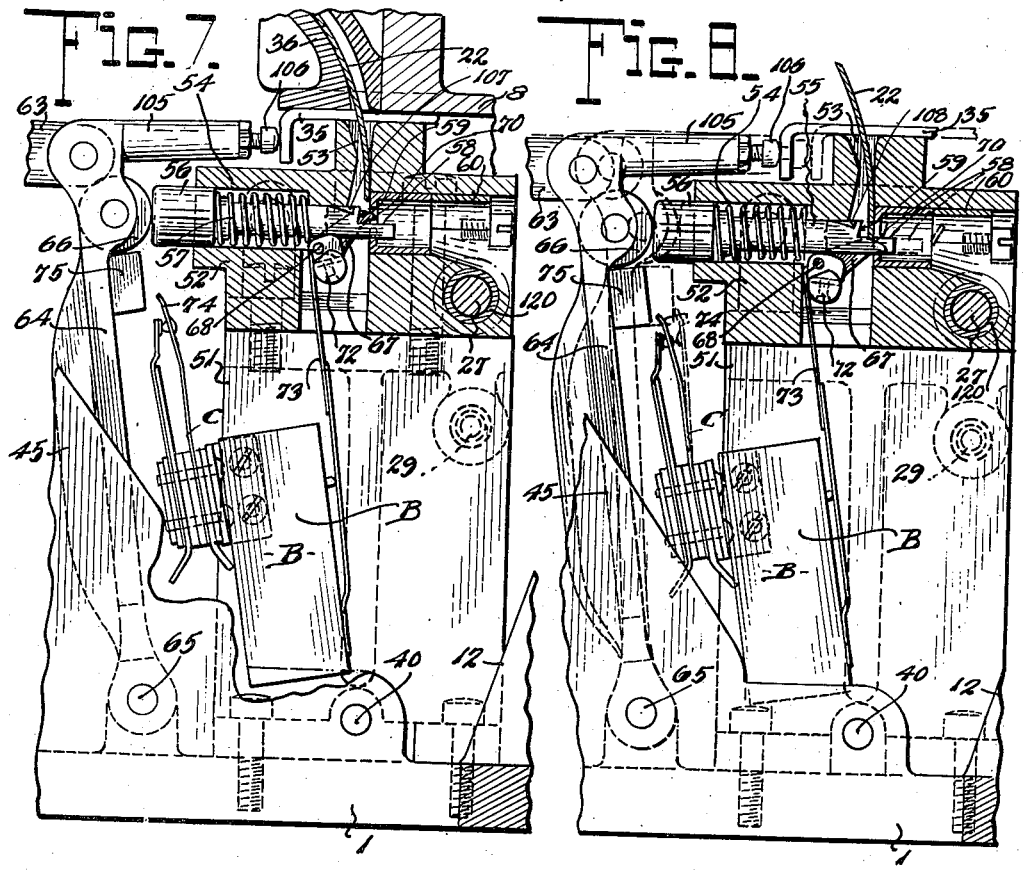
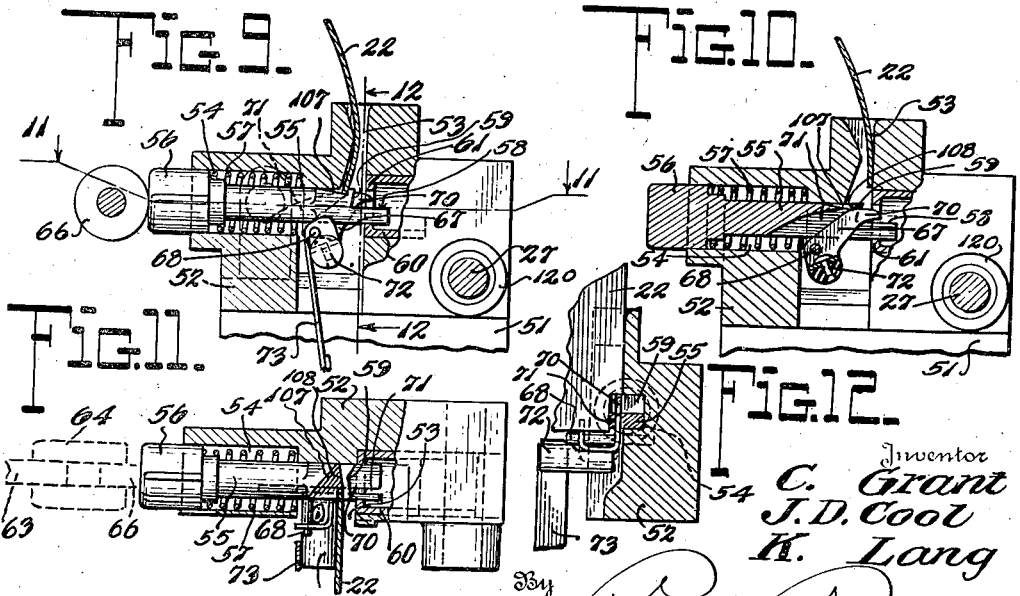

May 19, 1942.  C. GRANT ET AL  2,283,804
CARD PRINTING MACHINE
Filed April 27, 1940  5 Sheets-Sheet 5

Patented May 19, 1942

2,283,804

UNITED STATES PATENT OFFICE 2,283,804

CARD PRINTING MACHINE

Chester Grant, Syracuse, John D. Cool, Baldwinsville, and Kenneth Lang, Syracuse, N. Y., assignors to Gaylord Bros., Inc., Syracuse, N. Y., a corporation of New York Application April 27, 1940, Serial No. 332,060

7 Claims. (Cl. 101—297)

This invention appertains to printing or stamping machines, and more especially to card printing machines of the general type disclosed in Patent No. 2,039,600, granted May 5, 1936, to Joseph Locke. As described in that patent, these machines are primarily adapted for use in public libraries and generally similar places where books or other articles are borrowed or removed from their place of collection or custody, and the purpose of the machines is to provide a means for expeditiously recording the borrowing transaction and for identifying the borrower, as by stamping or printing suitable indicia upon a card or other record sheet.

According to the usual manner of use of these machines in public libraries, there is provided a type carrier or card having a type plate fixed thereto and bearing a number or other indicia for identifying a particular patron or borrower. The machines are so constructed that this type card may be inserted therein to enable a printing or stamping impression to be made upon another record card when the latter is inserted in the machine, suitable controls being provided as a part of the machine to automatically produce the printing or stamping operation incident to the insertion of the record card into a guide or opening provided in the machine to receive the same. Provision is also usually made for printing or stamping a date or other time indicia upon the record card simultaneously with the printing or stamping of the indicia represented on the type plate of the other card, the dating means being preferably adjustable to record selective dates corresponding to the date of the borrowing transaction or to the date when the borrowed book or other article is due to be returned.

In the preferred form of these machines in their present day use, the printing or stamping operations are automatically controlled responsive to insertion of the record card into the machine, as above indicated, to operatively position the same respecting the type plate card or type carrier which has been previously inserted. The automatic control mechanism is so constructed and arranged that only a single printing or impression is made at one time upon the record card, although it is to be understood that each impression may consist of one or more numbers, dates, or other indicia, or combinations thereof, according to the particular transaction to which the machine has been adapted.

To enable the recording of successive transactions upon the same record card, the record card is automatically notched or a small portion thereof cut away at one edge incident to each printing or stamping impression made thereon by the machine, thus causing successive impressions to be made on the record card in orderly and regularly spaced fashion, one below the other. The notching or cutting away of a portion of the card is also utilized to automatically render the card-controlled means temporarily inoperative pending subsequent manipulation of the record card after each impression is made thereon.

The primary feature disclosed in the Locke patent hereinabove referred to has to do with a positive control of the printing or stamping operation so that inadvertent or accidental successive impressions will not be produced. This feature is attained by a special automatic control mechanism of the card-operated type, which requires that the record card must be necessarily withdrawn from the machine for an appreciable or predetermined distance after each printing or stamping operation, before the machine is conditioned for performing a succeeding printing or stamping operation.

The present invention has for one of its primary objects the attainment of the same general automatic safety feature referred to in the preceding paragraph, but through means of a substantially different, more simple, and less costly mechanism.

With the foregoing as a background for the present invention, we shall now pass to a brief description of the additional features of improvement which have been embodied in our new printing machine.

Another important object of the invention is to provide a printing machine of the aforementioned character wherein the principal operating elements of the machine are all mounted on a common supporting base in such manner that greater accuracy in the machining of the parts and the base is possible, and giving rise to easier and a more simple assembly and interchangeability of the parts, more efficient action thereof, with less noise, longer wear, and greater freedom from clogging by accumulation of dirt, lint, etc., and requiring less service and inspection time as compared with previous machines heretofore available.

A further object of the invention is to provide an improved card notching punch and associated card-controlled tripping means embodying means on the punch for engaging the record card to displace the same from engagement with the trip and thereby automatically and positively release the trip at a predetermined instant in each printing operation, thus preventing accidental or inadvertent repeating operation of the printing elements.

Another object of the invention is to provide a pair of cooperating printing elements, one of which is movable towards the other to produce a printing or stamping operation upon a card interposed therebetween, and the movement of the movable printing element being imparted by card-controlled electromagnetic means of the solenoid and plunger type, together with means for preventing or minimizing rebound of the solenoid plunger upon completion of the printing stroke thereof.

The invention further contemplates an improved assembly of the actuating means for the printing elements and the card notching punch, said actuating means being so constructed and arranged that the movement of the movable printing element may be reduced to a minimum, while at the same time a substantially greater movement may be imparted by the actuating means to the card notching punch.

A still further object of the invention is to provide an improved electro-magnetic control system for the cooperating printing elements of the printing machine, said control system embodying means to positively assure deenergization of the electromagnetic means subsequent to each card controlled energization thereof in producing printing impressions upon a card or other record sheet.

Other and further objects and advantages of the invention will be hereinafter described and the novel features thereof defined by the appended claims.

In the drawings:

Figure 3 is a top plan view of the machine with the casing or housing and certain other parts removed;

Figure 4 is a view of the machine in end elevation, with the casing or housing shown in section and exposing the inner assembly;

Figure 5 is a view generally similar to Figure 2 as seen from the opposite side of the machine, and with the casing partly broken away and shown in section;

Figure 6 is a vertical sectional view taken approximately on the line 6—6 of Figure 3;

Figure 7 is a fragmentary sectional view taken about on the line 7—7 of Figure 3, showing the card punch and certain of the operating controls in their normal positions just prior to actuation of the card-controlled trip or trigger, the record card which actuates the trip or trigger being shown in section and out of engagement with the trip or trigger;

Figure 1:
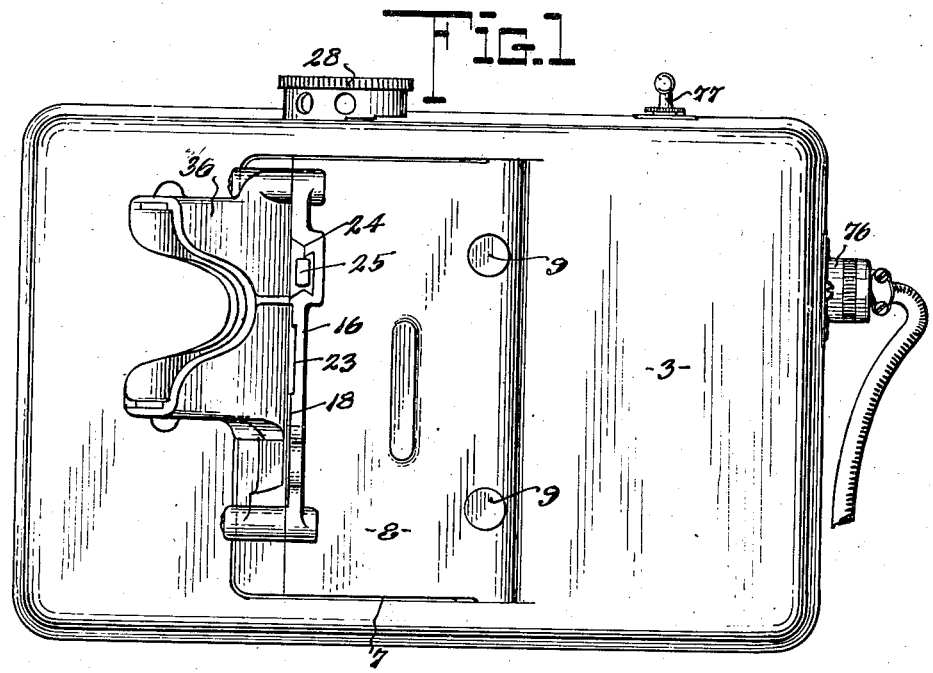
Figure 1 is a top plan view of a card printing machine constructed in accordance with our invention.

Figure 8 is a view generally similar to Figure 7, showing the card-controlled trip or trigger depressed by the card to initiate the printing or stamping operation, and also showing in dotted lines the action of the punch in cutting a notch in the edge of the card, and the action of the normally closed safety switch which assures deenergization of the platen operating solenoid responsive to each printing stroke of the platen;

Figure 9 is a fragmentary enlarged detail view of the card punch which is shown on its return stroke which follows each printing impression, with the record card engaged by a notch in the punch to displace the card from its initial trigger-depressing position shown in Figure 8;

Figure 10 is a vertical sectional view taken through the card punch about in the plane of the card-controlled trigger or trip, the record card being shown in a position similar to that in Figure 7;

Figure 11 is a horizontal sectional view taken about on the line 11—11 of Figure 9;

Figure 12 is a vertical sectional view taken about on the line 12—12 of Figure 9;

Figure 13 is a circuit diagram of the complete control circuit;

Figure 14 is a perspective view of a typical record card, illustrating two successive typical printing impressions and corresponding notches in the edge of the card, portions of the card which are successively cut away being represented in dotted lines;

Figure 15 is a perspective view of a typical type carrier having the form of a card upon which a type plate is mounted;

Figure 16 is an enlarged fragmentary detail view, partly in section and partly in elevation, showing the movable platen and its relationship to the record card, type plate card and interposed inked ribbon and ribbon guides, the latter being shown in section; and Figure 17 is a sectional view taken about on the line 17—17 of Figure 16, and showing the adjustable eccentric pin which serves to adjust the movable platen.

Like reference characters designate corresponding parts in the several figures of the drawings, in which 1 generally denotes a base or frame which is preferably provided with resilient feet or legs 2, and serves as a common support for the various mechanisms which make up the printing machine assembly. The base is constructed of any suitable material, preferably metal, of such thickness and weight to insure rigidity thereof. If desired, the base may be made in the form of a one-piece casting having suitable standards and lugs formed as an integral part thereof and rigidly braced by reenforcing webs or the like. Detachably secured to the base 1 in any suitable manner is an outer casing or housing, generally designated 3, which serves to substantially enclose the operating parts of the mechanisms which are mounted on the base. For convenience in guiding the housing or casing 3 in its assembly onto the base 1, and resisting lateral displacement thereof relative to the base, the base is preferably provided at each corner with a short upright pin or dowel 4 which is adapted to be received in a recess or aperture 5 formed in a lateral flange or lug 6 provided at each lower corner of the casing or housing. The upper side of the casing or housing 3 is provided with a generally rectangular opening 7 in which a cover plate 8 is adapted to be removably mounted, flush with the upper side of the housing, as clearly shown in the drawings. The cover 8 carries certain parts of the printing mechanism hereinafter more fully described, and the cover is preferably attached to and wholly supported by the base 1, as by means of a pair of screws 9, 9, extending through the cover near one edge thereof and into threaded sockets 10, 10 formed in the upper ends of the laterally spaced standards 11, 11 extending upwardly from the base 1 and braced by the integral webs 12, 12 and interconnecting web 13. The upper ends of the screw sockets 10, 10, are respectively enlarged to receive annular bosses 14 formed on the lower side of the cover 8 about the respective openings through which the attaching screws 9, 9 pass, the bosses 14 having a close fit in the upper enlarged ends of the screw sockets 10, 10 to accurately position the cover 8 in the opening 7 of the casing or housing 3, with sufficient clearance between the cover and the housing to permit free removal of the cover. By reason of this construction just described, vibrations and noise transmitted to the housing or casing 3 in the operation of the machine are reduced to a minimum.

To further insure reduction of noise and substantially silent operation of the machine, the casing or housing 3 may be lined interiorly with a lining of felt or other sound-absorbing material, as indicated at 15.

Along the edge of the cover 8 opposite to the attaching screws 9, 9, there is provided a vertical wall, generally designated 16, extending upwardly therefrom, and substantially co-extensive with this wall 16 is a vertical wall 17, which depends from the lower side of the cover. The walls 16 and 17 are provided with a continuous recess 18 facing towards the corresponding end of the machine, (the lefthand end as viewed in Figures 1 and 2). The width of this recess 18 generally corresponds to the width of card 19 shown in Figure 15, this card constituting a type carrier, as indicated by the type plate 20 affixed to the card. As shown in Figure 15, the type plate 20 is provided with indicia 21 of any suitable character, which indicia may be formed by stamping or otherwise embossing the type plate 20 to raise the indicia out of the plane of the type plate, enabling the same to produce a printing or stamping impression upon another card, such as the record card 22 shown in Figure 14. The type plate card 19, with the type plate 20 attached thereto, is insertable into the upper end of the recess 18 above described, and is freely movable in a downward direction in the recess to locate the type plate 20 at a suitable position in front of the depending wall 17, as clearly shown in Figure 16. In order to accommodate the additional thickness of the type plate 20 by affording sufficient clearance therefor to permit the type card 19 to be inserted in and withdrawn from the recess 18, the back wall of the recess is provided with an additional recess 23 generally corresponding in width to the width of the type plate 20.

Also provided in the walls 16 and 17 and laterally spaced from the recess 18 is a vertically elongated recess 24 in which is slidably mounted a date bar generally designated 25. This date bar carries a plurality of interchangeable type plates, generally similar to type plate 20, arranged one above the other on the date bar. The details of the construction of this date bar 25 and its type plates can be best understood from reference to the Locke patent hereinbefore referred to, and the additional patents referred to therein, for which reason these details are not illustrated or described in the present application. It is to be understood, however, that the date bar 25 is vertically adjustable in the recess 24, which adjustment is obtained by a pinion 26 fixed to a shaft 27 which extends laterally through one side of the housing or casing 3, as best shown in Figure 6. The outer end of the shaft carries a knob or hand wheel 28 which is preferably removably attached to the shaft 27, as by means of a set screw. A spring-pressed detent 29 serves to limit rotation of the knob or hand wheel 28 in adjusting the same to the date selective positions, corresponding to the respective dates or other time indicia depicted on the type plates carried by the date bar. The pinion 26 meshes with teeth formed on the back of the date bar, so that by rotating the knob or hand wheel 28 in one direction or the other, the date bar may be vertically adjusted in the recess 24 to selectively position the respective type plates carried thereby in horizontal alinement with the type plate 20 on the type card 19, when the latter card is inserted in its recess 18 to condition the machine for a printing operation.

Mounted on the front face of the wall 17 which depends from the lower side of the cover 8 is a relatively thin plate 30, as best shown in Figure 16. This thin plate 30 extends across the type card recess 18 and date bar recess 24, and is provided with suitable openings with which the type plates on the card 19 and on the date bar 25 can be registered. The lower edge of the plate 30 has a portion thereof laterally offset, as at 31, the offset projecting into the recess 18 at the lower end of the latter, and serving as an abutment to positively limit the downward movement of the type card 19 in the recess 18. The abutment 31 may be formed as an integral part of the plate 30, by providing a short tongue or flange on its lower edge. The plate 30 is also provided with a plurality of guides for receiving and guiding an inking ribbon 32 which is fed across the front of the plate 30, the ribbon being intermittently unwound from one spool 33 and wound upon another spool 34. The ribbon spools are suitably mounted on the lower side of the cover 8, and are intermittently actuated by a feeding mechanism, the details of which are not material to the present invention. Suffice it to say that the ribbon mechanism is preferably carried by the cover 8 which, in turn, is attached to the base 1 and not to the casing or housing 3. The ribbon feeding action is controlled by an actuator bar 35 which is slidably mounted on the lower side of the cover 8, as shown in Figures 5, 7 and 8. By intermittently reciprocating the actuator bar 35, the ribbon 32 will be moved intermittently in front of the type plates and across the openings in the thin plate 30 in an obvious manner.

Attached to the forward edge of the cover 8 and extending upwardly therefrom is a record card guide, generally designated 36. This guide 36 is adapted to receive the record card 22 and guide the same into a position for receiving printing or stamping impressions thereon produced by the type plates hereinbefore referred to. In order to space the record card from the inked ribbon 32, and prevent the card from catching or hanging on the ribbon as the record card 22 is inserted into the machine, there is provided another thin metal plate 37 which is attached to the depending wall 17 in such manner that it extends across the ribbon 32 in slightly spaced relation to the same, as clearly shown in Figure 16. This plate 37 is also provided with suitable apertures registering with the apertures in the plate 30 and with the type plates on the respective type card 19 and date bar 25.

To produce a printing or stamping impression upon the record card 22, there is provided a platen generally designated 38, which is movable towards and away from the cooperating printing elements consisting of the type plate 20 on the type card 19 and the type plates carried by the date bar 25. Thus, when the record card 22 is inserted downwardly through the guide 36 until it is interposed between the platen 38 and the type plates, a printing or stamping impression may be made upon the record card by moving the platen 38 into engagement with the record card 22 to force the record card firmly against the type and interposed inking ribbon 32. The operation of the movable platen 38 is preferably automatic and responsive to the insertion of the record card 22 into the machine, and the means by which this automatic action is produced will now be described in detail.

Figure 2:
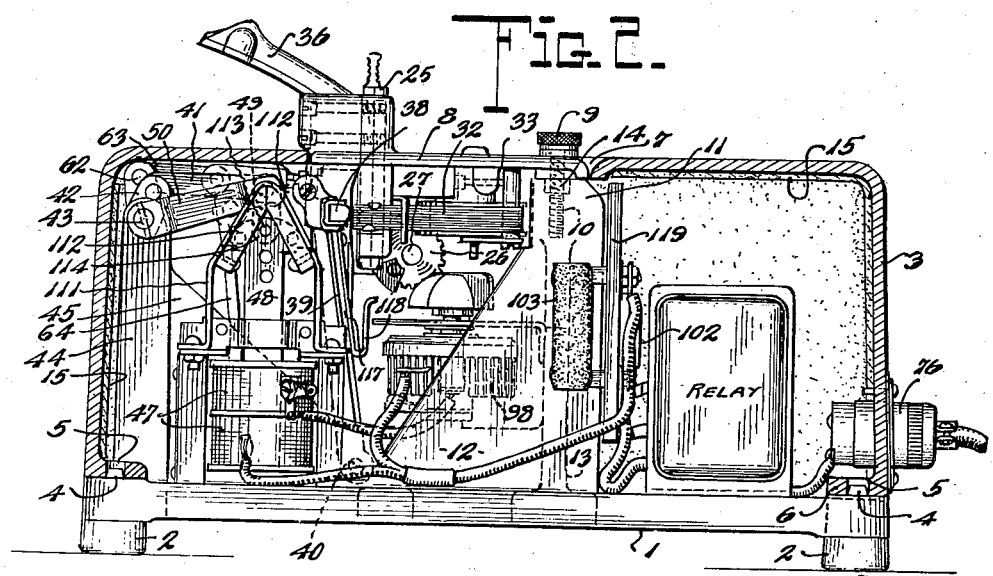
Figure 2 is a view of the machine in side elevation, with the outer casing or housing shown in section and exposing the assembly of the principal operating elements of the machine.

The platen 38 is fixed to the upper end of a lever or arm 39, the lower end of which is pivotally secured to the base 1, as at 40 (see Figure 2). The upper end of the arm 39 is connected by a link 41 to a crank arm 42 fixed on an oscillatable shaft 43. The shaft is journaled in spaced standards 44, 44, which extend upwardly from the base 1 and are preferably integrally formed therewith and suitably braced by the webs 45, 45, and the interconnecting web 46. Oscillating movement is imparted to the shaft 43 in any suitable manner, but preferably by an electromagnetic means of the solenoid and plunger type. The solenoid is generally indicated at 47, and is mounted on the base 1 with its hollow core disposed in a vertical position to receive the plunger 48. The upper end of the plunger 48 has a bifurcated link 49 pivotally connected thereto, and the upper end of the link 49 is pivotally connected to a crank arm 50 fixed to one end of the shaft 43, so that oscillating movement will be imparted to the shaft 43 responsive to vertically reciprocal movement of the plunger 48. The energization and deenergization of the solenoid 47 is controlled by the record card 22 in a manner now to be described.

Mounted on the base 1 at the side opposite to the solenoid 47 is a standard 51 having attached thereto at its upper end a block, generally designated 52. Formed in the inner face of the block 52 is an elongated groove 53 which extends the full height of the block. The upper end of the groove meets the lower end of the card guide 36 on the cover 8, and is co-extensive with the outer edge of the card guide, so that, when the record card 22 is inserted in the guide 36 and moved downwardly therethrough, the outer edge of the card will freely pass into the channel 53 in the block 52, which serves to guide the edge of the card in its further movement in a downward direction. The block 52 is also provided with a horizontal bore 54, which is extended completely through the block from front to back. Mounted in the bore 54 is a punch 55 having an enlarged head 56 formed on its forward end. The forward portion of the bore 54 is enlarged to guide the head of the punch which is axially reciprocal in the bore, and a spring 57 is disposed in the enlarged end of the bore and abuts against the inner side of the punch head 56 so as to normally urge the punch in a forward direction. The rear end of the punch extends across the card guiding channel 53 in the block 52, as clearly shown in Figures 7 to 12 inclusive. The rear end of the punch is cut away, as at 58, to form a cutting shoulder 59. Mounted in the rear end of the bore 54 in the block 52 is a sleeve 60 having a shoulder 61 disposed for cooperation with the cutting edge of the punch. The punch 55 is normally positioned so that when a record card 22 is inserted in the guide 36 and moved downwardly through the guiding channel 53 in the block 52, the lower corner of the card will ultimately engage the punch, as shown in Figure 8, thus preventing further downward movement of the record card. When the record card thus engages the punch, its lower end will have reached a position between the cooperating printing elements hereinbefore described, which position corresponds to the printing or stamping position. In this position of the record card, its lower corner is disposed in back of the cutting shoulder 59 on the punch, so that, if the punch is now moved rearwardly to the dotted line position shown in Figure 8, it will cut a small rectangular notch in the edge of the record card. When the notch has been cut in the record card, the record card 22 may then be moved downwardly for a further distance to position the record card for receiving a subsequent printing impression slightly above the preceding printing impression. Accordingly, it will be understood that successive notchings of the card afford a control of the printing impressions so that they may be made upon the record card in an orderly fashion one above the other.

The cutting stroke of the punch is produced by a system of actuating levers which are operatively connected with the oscillatable shaft 43 previously described. As best shown in Figures 3 to 8 inclusive, the end of the shaft 43 opposite to that which carries the crank arm 50 has fixed thereto a short bifurcated crank arm 62, which in turn is pivotally connected to one end of a link 63. The opposite end of the link 63 is pivotally connected to the upper end of a long arm or lever 64 of approximately the same length as the arm 39 which carries the movable platen 38. The lower end of the arm 64 is pivoted, at 65, to the base 1. Adjacent to the upper end of the arm 64, there is mounted a hardened roller 66 which engages the head 56 of the punch 55. It will be understood from the foregoing that, when the shaft 43 is rocked in one direction incident to downward movement of the solenoid plunger 48, the arm 64 will pivot in a clockwise direction, as viewed in Figures 7 and 8, causing the hardened roller 66 to press the punch head 56 rearwardly and impart sufficient movement to the punch 55 to cut a notch in the edge of the record card 22, as previously described. The spring 57 serves to restore the punch, as well as the movable platen 38 and the solenoid plunger 48, to their respective initial positions, thus permitting the record card 22 to be withdrawn from the machine after a printing operation, and the same or a different record card to be inserted for a subsequent printing operation.

In order to automatically control the movement of the punch 55 and the platen 38, there is provided a trip member or trigger 67 which is pivotally mounted on the block 52 so as to be actuated by the record card 22 as it is inserted into the machine and withdrawn therefrom. This trip or trigger member is so constructed as to be capable of being mounted on a pivot pin 68 having engagement therewith at spaced points to provide a double pivot bearing assuring perfect alinement of the trigger. For this purpose, the trigger member is formed so as to be substantially U-shaped in transverse cross section in the zone of the pivot pin 68, as best shown in Figure 12. One arm 70 of the trigger member is elongated and is normally disposed in a slot 71 formed in the punch 55 and extending generally parallel to the central axis of the punch at one side thereof (see Figures 10 to 12). The free extremity of the trigger arm 70 is thus disposed in the path of the lower corner of the record card as the latter is moved downwardly through the guide channel 53 in the block 52, enabling the trigger arm 70 to be depressed as the record card approaches the punch, as clearly shown in Figure 8. Attached to the trigger 67 adjacent to the pivot pin 68 is a laterally offset abutment 72 which engages an arm 73 forming a part of a normally open control switch generally designated B, which is interposed in the electric circuit for the solenoid 47. The switch arm 73 is preferably made of a yieldable or spring material, and the switch B is preferably of such construction that a slight movement of the arm 73 in opposite directions is sufficient to open and close the switch.

Attached to any convenient stationary part on the base 1, such as the standard 51 which supports the block 52, is a second switch generally designated C. This switch is of the normally closed type, and is provided with an arm 74 adapted to be engaged by an abutment 75 fixed to the punch actuating arm 64, the arrangement being such that the abutment 75 engages the arm 74 of switch C and opens the contacts of switch C at a predetermined time in the cutting stroke of the punch 55 and corresponding printing stroke of the platen 38.

Referring now to the circuit diagram shown in Figure 13, 76 designates a plug which is mounted on the base 1 of the machine at one end thereof so as to remain attached to the base when the housing or casing 3 is removed. The housing is provided with a notch in the lower edge of its end wall to receive the plug 76 as the housing is applied onto the base. Also attached to the base at any convenient point is a single-pole double-throw switch generally designated 77, which is also receivable in a notch in the corresponding wall of the housing 3 so as to enable the housing to be mounted on the base and removed therefrom without disturbing the switch 77. The movable arm 78 of the switch 77 is connected by a conductor 79 to one side of the plug 76. This switch arm 78 is selectively engageable with spaced contacts 80, 81, across which is shunted a resistance element 82. Leading from one of the switch contacts, such as 80, is a conductor 83 which is connected to one side of the normally open switch B. The other side of switch B is connected by a conductor 84 to one end of a relay coil 85. The other end of the relay coil 85 is connected by a conductor 86 to one side of the normally closed switch C, and the other side of the normally closed switch C is connected by a conductor 87 to a conductor 88 leading back to the opposite side of the plug 76. The relay coil 85 serves to actuate an armature 89 carrying spaced contacts 90, 91, which are disposed for operative engagement with corresponding spaced contacts 92 and 93. Contacts 90 and 91 are in electrical conductive relation to each other, so that, when they engage contacts 92, 93, they will establish a circuit across these contacts. Contact 93 is connected by a conductor 94 to the contact 80 of switch 77, and contact 92 is connected by conductors 95 and 96 to one end of the solenoid 47. The other end of the solenoid is connected by a conductor 97 to the center pole of a rheostat 98, and the other side of the rheostat is connected by a conductor 99 to another conductor 100, which in turn is connected to conductors 87 and 88. Conductors 99 and 100 are connected by a conductor 101 to one side of a parallel circuit consisting of a condenser 102 and a resistance element 103 arranged in parallel with each other. The opposite side of this parallel circuit is connected by a conductor 104 to the juncture of conductors 96 and 95. The purpose of this parallel circuit containing the condenser and resistance element is to reduce the sparking at the relay contacts and the contacts of the various switches. While the relay may be of any suitable type, we find that a relay having a relatively slow release time is best suited for the purposes of our machine. On the other hand, by employing switches B and C of sufficiently high capacity, the relay may be entirely dispensed with, if desired, as will be obvious to those skilled in the art.

Having described the complete circuit, it will be seen that when a record card 22 is moved downwardly to the position shown in Figure 8, with the lower corner of the record card engaged with and depressing the trip or trigger 67, normally open switch B will thereby be closed through the rocking action of abutment 72 against the switch arm 73. The closing of this switch B establishes a circuit through the normally closed switch C to energize the relay coil 85. Energization of the relay coil 85 causes contacts 90 and 91 to engage the respective contacts 92 and 93, thus establishing a circuit from the line plug 76 to the solenoid 47, energizing the solenoid. Pursuant to the energization of solenoid 47, plunger 48 is drawn downwardly, thus imparting a rocking movement in one direction to the common actuator shaft 43, which is operatively connected to the movable platen 38 and punch 55. The platen is thereby caused to move towards the cooperating printing elements previously described, thereby producing a stamping or printing impression upon the record card 22. At about the instant that the printing or stamping impression is made upon the record card, or slightly before the impression is made, the punch 55, which is being moved rearwardly at the same time as the platen 38, cuts a notch in the lower corner of the card 22, thereby freeing the trigger or trip arm 70 so that it immediately becomes restored to its normal position shown in Figure 7 by the resilient action of the arm 73, which forms a part of the switch B. By the release of the trip arm 70, the switch B is restored to its normally open condition, breaking the circuit to the relay coil 85, the deenergization of which causes the relay contacts to open and break the circuit to the solenoid 47, allowing the solenoid plunger 48 to move upwardly under the influence of the spring 57. With the upward movement of the plunger 48, the punch 55 and platen 38 are moved back to their initial or normal positions.

The ribbon feed actuator bar 35 is intermittently actuated by an arm 105 formed on the upper end of the pivotally mounted punch actuating lever 64, the forward end of this arm 105 having an adjustable abutment in the form of a screw 106 which may be adjusted to bring about the feeding action of the inked ribbon at the proper time and with a sufficient amount of feeding movement imparted to the ribbon so as to intermittently present a fresh portion of the ribbon to the printing surfaces of the type plates. By reason of the particular arrangement of actuating mechanisms for the platen 38 and the punch 55 as previously described, the travel or movement of the platen may be kept down to a minimum, while at the same time the travel of the punch is substantially greater, thus affording an improved card punching or notching action.

The purpose of the normally closed switch C will now be described. It will be seen from Figure 13 that this switch C is arranged in series with the relay coil 85 and switch B, the latter switch being controlled by the card 22. If the trigger or trip arm 70 should happen to stick or jam while in its depressed position shown in Figure 8, it would not release when the card 22 is notched by the punch, and the relay coil 85 and solenoid 47 would consequently remain energized in the absence of switch C. However, this normally closed switch C is automatically opened at a predetermined instant during the printing operation by engagement of the abutment 75 with the extended arm 74 of this switch, causing the switch C to open and break the circuit in which the relay coil 85 is arranged, thereby positively assuring deenergization of the relay coil and consequent deenergization of the solenoid 47. The timing of the opening of the switches B and C may be such that the opening takes place at about the same instant that the impression is made upon the record card 22. On the other hand, the switches may open just before the printing impression is made, in which case the inertia of the platen 38 will be sufficient to complete the printing stroke thereof before the platen drops back to its initial position spaced from the cooperating printing element.

The purpose of the switch 78 is to selectively dispose the resistance element 82 in the circuit or cut it out of the circuit as a convenient means of controlling the weight of the printing impression made upon the record card 22, under varying voltage conditions encountered in the use of the machine. If the voltage of the line circuit to which the machine is connected is normal, the switch 77 may be adjusted to the position shown in Figure 13, in which position the resistance element 82 is cut out of the circuit. On the other hand, should the voltage be high, the switch 77 may be thrown to bring the arm 78 into engagement with the contact 81, thereby disposing the resistance element 82 in the circuit to offset the higher voltage.

The rheostat 98 affords a still further and finer adjustment of the weight of the printing impression. By manipulating the switch 77 and/or the rheostat 98, a uniform weight of the printing impressions may be attained irrespective of a reasonable range of variation of the voltage of the line circuit which is connected to the plug 76. These same elements may be used to change the weight of the printing impressions at any time to suit the particular requirements or desires of the user of the machine.

It has been found that in machines of this general type, it is desirable to provide some means for preventing repetition of the printing stroke of the machine which otherwise might happen either through carelessness in handling of the record card 22 by the operator or through some inadvertent or involuntary depression of the trigger or trip arm 70 following a particular printing operation where only one stamping or printing impression is desired. To this end, we have made provision for positively and automatically displacing the record card 22 relative to the trigger or trip arm 70 after each printing stroke of the machine, to thereby insure release of the trigger or trip arm, and requiring a deliberate manipulation of the record card before a succeeding printing operation may be performed. Referring to Figures 7 to 12 inclusive, it will be seen that the upper side of the punch 55 is notched, at 107, this notch being disposed forwardly of the cutting face 59 of the punch and extending generally transversely across the punch. The notch is progressively deeper from front to back, as best shown in Figure 11, and the notch may slope upwardly from its inner edge adjacent to the record card 22 towards the upper side of the punch. It will be seen that the shape of the notch is such as to form an abrupt shoulder 108 in the zone of the trigger or trip arm 70. Accordingly, as the punch moves rearwardly to cut away the lower corner of the record card, as shown in dotted lines in Figure 8, the upper edge of the notch formed in the record cord will automatically be received in the notch 107 as the punch continues its rearward travel slightly beyond the card cutting position thereof. When the card has been engaged in the notch 107, it will be automatically and positively maintained out of engagement with the trigger or trip arm 70, assuring that the trigger or trip arm will be released so as to deenergize the solenoid 47 and cause the platen 38 and punch 55 to be restored to their normal positions. As the punch moves forwardly during its return stroke, the record card will be deflected by the shoulder 108 at the rear of the notch 107, and drawn forwardly to the position shown in Figure 9. In order to perform another printing operation upon the record card 22, it is necessary to lift the record card upwardly out of the notch 107, and although this upward movement need only be slight, it is sufficient to require a deliberate action on the part of the operator and to offset any tendency to produce an involuntary or accidental repeating operation.

As shown in Figures 3 and 5, there is provided a generally cylindrical receptacle or cup 109 at the rear of the standard 51, the upper open end of the receptacle being arranged below the rear end of the bore through the block 52 so that, as the record card or cards are punched out by the punch 55, the fragments, as shown in dotted lines in Figures 8 and 14, will be discharged through the bore behind the punch and will drop into the receptacle. The receptacle may be held in place in any suitable manner, resting upon the base 1, as by means of a spring clip 110 attached to the inner side of the housing or casing 3 so as to yieldably urge the receptacle into firm engagement with the back of the standard 51.

In order to limit the upward movement of the solenoid plunger 48 and to eliminate or minimize rebound thereof upon completion of the printing stroke, we provide a frame comprising spaced straps 111, 111 mounted on the upper end of the solenoid 47, one strap at each side of the plunger 48. The upper portion of each strap is generally V-shaped, with its apex disposed in a plane passing transversely through the center of the plunger 48. Attached to the inside of each strap 111 so as to lie in the V-shaped portion thereof is a pair of resilient cushioning members 112, 112, having their inner surfaces disposed in upwardly converging relation to each other. Extending transversely through the upper end of the plunger 48 and projecting outwardly beyond the opposite sides thereof is a pin 113 which serves to pivotally connect the plunger 48 with the link 49 which is pivotally attached to the free end of the crank arm 50 on the oscillatable shaft 43.

The pin 113 is provided on its opposite projecting ends with sleeves or collars 114 suitably fixed thereto so as to engage the inner converging surfaces of the resilient members 112, 112 as the plunger approaches the upper limit of its vertical movement. The resilient members 112, 112 thereby constitute abutments for cooperating with the collars or sleeves 114 on the opposite ends of the pin 113 to limit the upward movement of the plunger 48. As the sleeves engage the resilient members, the resilient material, which may be soft rubber, is compressed somewhat, thereby causing the sleeves or collars to be wedged between the converging surfaces of the resilient material, and the resilient material produces a limited gripping action upon the sleeves or collars, preventing rebound of the plunger.

Referring to Figures 16 and 17, there has been shown a simple means for adjusting the platen 38 and its supporting lever 39 relative to the cooperating printing elements, such adjusting means having the form of a pin 115 extending through the upper bifurcated end 39' of the platen supporting lever 39, and provided with an eccentric portion 116 located in the end of the link 41 which is connected to the platen supporting lever. By rotating the pin 115, a limited range of adjustment is afforded so that any loose play or wear in the actuating parts may be compensated for, and the weight of the printing impressions may also be adjusted thereby. The pin 115 may be held against turning in any suitable manner, as by means of a set screw, not shown.

Carried by the platen supporting lever 39 and disposed below the cooperating printing elements is a plate 117 having its lower end folded upon itself, as best shown in Figure 2, and forming a stop 118 for limiting downward of the record card 22. When the record card has received the maximum number of printing impressions which it is practicable to make thereon, this card stop prevents the record card from being inserted into the machine to such an extent that it would be difficult for the operator to grasp the upper edge of the same to withdraw the card from the machine.

As best seen in Figures 2, 3 and 5, a wiring panel 119 is preferably provided to facilitate the wiring of the electrical control elements. This panel is composed of suitable insulating material, such as Bakelite, and is attached to the back of the standards 11, 11 in an upright position, and carries a plurality of terminals to which the conductors are connected in the manner of the electrical circuit diagrammatically shown in Figure 13. The panel also serves as a support for the resistance elements 82 and 103, as shown in Figure 3. The condenser 102 is also conveniently supported by the panel.

As shown in Figure 6, the rotatable shaft 27 carrying the pinion 26 which serves to adjust the date bar 25, is journaled in a bearing 120 provided in the block 52, which is mounted on the standard 51. In order to remove the housing or casing 3 from the base 1, it is first necessary to remove the hand wheel or knob 28 from the outer end of the shaft 27, and to displace the shaft axially inwardly through the bearing 120 until the end of the shaft opposite to the pinion 26 is free of the casing and disposed inwardly thereof. Access to the interior of the machine for facilitating displacement of the shaft 27, and adjustment of other parts of the mechanisms, such as the rheostat 96, may be readily had by removing the cover 8 from over the opening 7 in the top of the casing or housing 3. To remove this cover, it is simply necessary to remove the screws or bolts 9, 9, by which the cover is attached to the standards 11, 11.

Operation of the machine should be obvious from the foregoing description and may be briefly summarized as follows: A type plate card, such as 19, is first inserted and moved downwardly into the recess 18 until the lower end of the card engages the abutment 31, as shown in Figure 16. Thereupon, the record card, such as 22, is inserted in the guide 36 and moved downwardly until its lower corner depresses the trigger or trip arm 70 and closes the normally open switch B. Since switch C is normally closed, the electrical circuit to the solenoid 47 is completed, causing the solenoid to be energized. Energization of the solenoid 47 pulls the plunger 48 downwardly, rocking the shaft 43 to pivotally actuate the platen lever 39 in a direction moving the platen towards the cooperating printing elements, thereby producing a printing or stamping impression upon the record card. During the printing stroke, the punch 55 is actuated by the shaft 43 through the intermediary of the pivotal lever 64, causing a notch to be cut out of the corner of the record card, which in turn releases the trigger or trip arm 70 and allows the same to rise to its normal elevated position, and the switch B to open. This in turn deenergizes the solenoid 47, and the platen 38 and punch 55 move forwardly to their normal positions responsive to the action of the spring 57. Should the trigger or trip arm 70 stick, thus keeping switch B closed, switch C functions automatically by engagement of the abutment 75 on the lever 64 with the extended arm 74 of the switch C to open the switch, insuring deenergization of the solenoid. Under some circumstances, the operating mechanism may "flutter" momentarily, but this is not objectionable, but, in fact, may serve to jar the trigger or trip arm 70 loose where it has previously become stuck or jammed. It is to be understood, however, that this is an abnormal condition and rarely occurs in actual use, especially in view of the double pivot which is provided for the trip arm or trigger 67, and which effectively maintains the trip arm 70 in alinement with the slot 71 in the punch 55. Sufficient clearance is provided between the trip arm 70 and the sides of the slot 71 to normally allow free movement of the trip arm as it is depressed and released by the record card 22.

When the punch 55 has cut out a notch in the lower corner of the card, the notched edge of the card is automatically engaged in the notch 107 provided in the upper side of the punch, and on the return movement of the punch, the shoulder 108 positively displaces the lower end of the record card to a position as shown in Figure 9, with the record card free from engagement with the trip arm 70. This necessitates that the record card be lifted out of the notch 107 before it can again depress the trip arm 70 and produce another printing or stamping impression upon the card. As the record card 22 is successively notched at its edge by the punch 55 in the performance of successive printing operations, the printing or stamping impressions will be made upon the card in uniformly spaced relation, one above another, until the card has been so filled to a point where the lower end thereof will engage the card stop 118 carried by the pivotal lever 39, and further downward movement of the record card is prevented.

While the specific details have been herein shown and described, the invention is not confined thereto as changes and alterations may be made without departing from the spirit thereof as defined by the appended claims.

Having thus described our invention, what we claim as new and desire to secure by Letters Patent is:

1. In apparatus of the class described, cooperative printing elements between which a card or the like is adapted to be inserted and removed, card-controlled means engageable by the card on insertion thereof between the printing elements for actuating said printing elements to print upon the inserted card, and means for displacing the card to a position out of engagement with the card-controlled means incident to the printing operation of the printing elements, said last-named means comprising a member normally disposed in the path of insertion movement of the card and shiftable transversely in opposite directions across the edge of the card, said member having a shoulder normally spaced from the card-controlled means and movable past the card in one direction of shifting movement of the member aforesaid, but having abutting engagement with the edge of the card at a predetermined position of the shiftable movement of the member in the opposite direction, to displace the card by the shoulder on continuation of the said opposite shifting movement of the member to restore the shoulder to its normally spaced position aforesaid relative to the card-controlled means.

2. In apparatus of the class described, cooperative printing elements between which a card or the like is adapted to be inserted and removed, card-controlled means engageable by the card on insertion thereof between the printing elements for actuating said printing elements to print upon the inserted card, and means for deflecting the card to a position out of engagement with the card-controlled means incident to the printing operation of the printing elements, said last-named means comprising a member normally disposed in the path of insertion movement of the card and shiftable transversely in opposite directions across the edge of the card, said member having a shoulder engageable with the edge of the card at a predetermined position of its transversely shiftable movement so that the card will be deflected by the shifting movement of the member in one direction.

3. In apparatus of the class described, cooperative printing elements between which a card or the like is adapted to be inserted and removed, card-controlled means engageable by the card on insertion thereof between the printing elements for actuating said printing elements to print upon the inserted card, and means for displacing the card to a position out of engagement with the card-controlled means incident to the printing operation of the printing elements, said last-named means comprising a member normally disposed in the path of insertion movement of the card and shiftable transversely across the edge of the card, said member having a shoulder engageable with the edge of the card at a predetermined position of its transversely shiftable movement so that the card will be displaced by the shifting movement of the member, and said member also being provided with a cutting face arranged in advance of the shoulder and cooperating with a stationary cutting edge to cut away a portion of the card at the edge of the latter pursuant to operation of the printing elements and prior to displacement of the card by the shoulder, the shoulder serving to displace the card on shifting movement of the member in a direction opposite to the cutting movement of the cutting face aforesaid.

4. In apparatus of the class described, cooperative printing elements between which a card or the like is adapted to be inserted and removed, card-controlled means engageable by the card on insertion thereof between the printing elements for actuating said printing elements to print upon the inserted card, and means for displacing the card to a position out of engagement with the card-controlled means incident to the printing operation of the printing elements, said last-named means comprising a member normally disposed in the path of insertion movement of the card and shiftable transversely across the edge of the card, said member having a shoulder engageable with the edge of the card at a predetermind position of its transversely shiftable movement so that the card will be displaced by the shifting movement of the member, and said member also being provided with a cutting face spaced from the shoulder and normally disposed nearer to the inserted card and cooperating with a stationary cutting edge to cut away a portion of the card at the edge of the latter pursuant to operation of the printing elements and prior to displacement of the card by the shoulder, said shoulder serving to displace the card on shifting movement of the member in a direction opposite to the cutting movement of the cutting face aforesaid.

5. In apparatus of the class described, cooperative printing elements between which a card or the like is adapted to be inserted and removed, card-controlled means engageable by the card on insertion thereof between the printing elements for actuating said printing elements to print upon the inserted card, and means for displacing the card to a position out of engagement with the card-controlled means incident to the printing operation of the printing elements, said last-named means comprising a member normally disposed in the path of insertion movement of the card and shiftable transversely across the edge of the card, said member being provided with a notch extending across the side of the same next to the edge of the inserted card and forming a shoulder for engagement with the edge of the card at a predetermined position of the transversely shifting movement of the member so that the card will be displaced by the shifting movement of the member.

6. In apparatus of the class described, cooperative printing elements between which a card or the like is adapted to be inserted and removed, card-controlled means engageable by the card on insertion thereof between the printing elements for actuating said printing elements to print upon the inserted card, and means for displacing the card to a position out of engagement with the card-controlled means incident to the printing operation of the printing elements, said last-named means comprising a member normally disposed in the path of insertion movement of the card and shiftable transversely across the edge of the card, said member being provided with a notch of progressively increasing depth in one direction of shifting movement of the member and extending across the side of the same next to the edge of the inserted card and forming a shoulder for engagement with the edge of the card at a predetermined position in one direction only of the shifting movement of the member so that the card will be displaced by the shifting movement of the member.

7. In apparatus of the class described, cooperative printing elements between which a card or the like is adapted to be inserted and removed, card-controlled means including a pivotal trigger member engageable by the card on insertion thereof between the printing elements for actuating said printing elements to print upon the inserted card, and means for displacing the card to a position out of engagement with the card-controlled means incident to the printing operation of the printing elements, said last-named means comprising a member normally disposed in the path of insertion movement of the card and shiftable transversely across the edge of the card, said member having a shoulder engageable with the edge of the card at a predetermined position of its transversely shiftable movement so that the card will be displaced by the shifting movement of the member, and said member also being provided with a slot therein which the trigger member aforesaid is received and is free to move responsive to engagement thereof by the card.

CHESTER GRANT.
JOHN D. COOL.
KENNETH LANG.